(12) United States Patent
Brick et al.

(10) Patent No.: US 8,998,479 B2
(45) Date of Patent: Apr. 7, 2015

(54) SURFACE LIGHT GUIDE AND PLANAR EMITTER

(75) Inventors: Peter Brick, Regensburg (DE); Stephan Kaiser, Regensburg (DE); Gerhard Kuhn, Koefering (DE); Ales Markytan, Regensburg (DE); Julius Muschaweck, Gauting (DE); Christian Neugirg, Regensburg (DE)

(73) Assignee: OSRAM Opto Semiconductor GmbH, Regensburg (DE)

(*) Notice: Subject to any disclaimer, the term of this patent is extended or adjusted under 35 U.S.C. 154(b) by 59 days.

(21) Appl. No.: 13/643,055

(22) PCT Filed: Mar. 23, 2011

(86) PCT No.: PCT/EP2011/054454
§ 371 (c)(1),
(2), (4) Date: Jan. 11, 2013

(87) PCT Pub. No.: WO2011/131446
PCT Pub. Date: Oct. 27, 2011

(65) Prior Publication Data
US 2013/0114292 A1    May 9, 2013

(30) Foreign Application Priority Data
Apr. 23, 2010  (DE) .......................... 10 2010 018 033

(51) Int. Cl.
*F21V 7/04*     (2006.01)
*F21V 8/00*     (2006.01)

(52) U.S. Cl.
CPC ............ *G02B 6/0016* (2013.01); *G02B 6/0041* (2013.01); *G02B 6/0076* (2013.01); *G02B 6/0035* (2013.01); *G02B 6/0068* (2013.01); *G02B 6/0073* (2013.01)

(58) Field of Classification Search
USPC .......................................... 362/608, 615, 617
See application file for complete search history.

(56) References Cited

U.S. PATENT DOCUMENTS

| | | | |
|---|---|---|---|
| 6,201,914 B1 | 3/2001 | Duguay et al. | |
| 7,072,544 B2 | 7/2006 | Cornelissen et al. | |
| 7,278,775 B2 | 10/2007 | Yeo et al. | |
| 2007/0081780 A1 | 4/2007 | Scholl | |
| 2007/0133935 A1 | 6/2007 | Fine | |
| 2007/0210326 A1* | 9/2007 | Kurihara ........................ | 257/98 |
| 2009/0073721 A1 | 3/2009 | Kamikatano et al. | |

FOREIGN PATENT DOCUMENTS

| | | |
|---|---|---|
| DE | 195 14 649 A1 | 10/1996 |
| EP | 1 909 122 A2 | 4/2008 |
| EP | 2 081 079 A2 | 7/2009 |

(Continued)

*Primary Examiner* — Anh Mai
*Assistant Examiner* — Meghan Dunwiddie
(74) *Attorney, Agent, or Firm* — Slater & Matsil, L.L.P.

(57) ABSTRACT

A surface light guide has a radiation exit area extending along a main extension plane of the surface light guide and is provided for laterally coupling radiation. The surface light guide includes scattering locations for scattering the coupled radiation. The surface light guide includes a first boundary surface and a second boundary surface which delimit the light conductance of the coupled-in radiation in the vertical direction. A first layer and a second layer are formed on each other in the vertical direction between the first boundary surface and the second boundary surface. Further disclosed are a planar emitter including at least one surface light guide.

20 Claims, 4 Drawing Sheets

(56) References Cited

FOREIGN PATENT DOCUMENTS

| GB | 2463913 A | 3/2010 |
| WO | WO 01/90637 A1 | 11/2001 |
| WO | WO 2009/040725 A2 | 4/2009 |

* cited by examiner

SURFACE LIGHT GUIDE AND PLANAR EMITTER

This patent application is a national phase filing under section 371 of PCT/EP2011/054454, filed Mar. 23, 2011, which claims the priority of German patent application 10 2010 018 033.5, filed Apr. 23, 2010, each of which is incorporated herein by reference in its entirety.

TECHNICAL FIELD

The present patent application relates to a surface light guide and to a planar emitter comprising at least one such surface light guide.

BACKGROUND

In conventional radiation sources, the generated radiation typically emerges from a comparatively small area. This area can be enlarged for example by a diffusing screen being disposed downstream. However, this can result in a luminance distribution that is comparatively inhomogeneous over the radiation exit area.

SUMMARY OF THE INVENTION

In one aspect, large-area emission can be achieved with high homogeneity.

In one embodiment, a surface light guide comprises a radiation exit area running along a main extension plane of the surface light guide, wherein the surface light guide is provided for laterally coupling in radiation. The surface light guide comprises scattering locations for scattering the coupled-in radiation. The surface light guide comprises a first interface and a second interface, which delimit light guidance of the coupled-in radiation in a vertical direction, that is to say in a direction running perpendicular to the main extension plane. A first layer and a second layer are formed one on top of the other in the vertical direction between the first interface and the second interface.

The surface light guide is preferably provided for coupling in radiation having a first radiation component and having a second radiation component. These radiation components can differ from each other for example with regard to the spatial coupling into the surface light guide or with regard to a peak wavelength.

By means of the first layer and the second layer it is possible to form, with regard to the scattering, light guiding regions of different types for the first radiation component and the second radiation component.

The first layer and the second layer are furthermore preferably formed in such a way that the first radiation component and the second radiation component emerge homogeneously from the radiation exit area.

In other words, the scattering effect in the surface light guide is adjustable by means of the first layer and the second layer for the different radiation components. The coupled-in radiation can emerge from the radiation exit area over a large area and at the same time with a high homogeneity.

In this case, the homogeneity relates, in particular, to the spatial homogeneity of the radiation emerging from the radiation exit area and also the homogeneity of the color locus of the emitted radiation depending on the location on the radiation exit area and/or on the emission angle.

As a measure of the homogeneity of the color locus, for two arbitrary points on the radiation exit area it is possible to plot the color locus for a predefined angle in the chromaticity diagram (CIE diagram).

Preferably, the points lie within a 5-step McAdam ellipse, particularly preferably within a 3-step McAdam ellipse.

At least one of the radiation components preferably lies in the visible spectral range. In particular, the spectral components can be provided for generating mixed radiation, for instance radiation that appears white to the human eye.

By means of the light guiding regions of different types, the surface light guide can be formed such that the scattering effect in the light guide can be adapted for the respective radiation components. In particular, the first layer and the second layer can be formed so as to compensate for a wavelength-dependent scattering effect at the individual scattering locations. In contrast thereto, a conventional surface light guide comprises a single light guiding region, in which all radiation components propagate, such that a wavelength-dependent scattering effect of the scattering locations has the effect that the wavelength components for which the scattering effect is highest emerge from the surface light guide with an increased probability.

In case of doubt, lateral coupling-in is understood to mean coupling into the surface light guide in which a main direction of the coupling-in is implemented along the main extension plane of the surface light guide. The surface light guide is furthermore preferably formed in such a way that it has a high transparency in the switched-off state, that is to say in the absence of a radiation source effecting lateral coupling-in. In this context, a high transparency is understood to mean that in the surface light guide the absorption and the scattering of radiation are so low that the sum of specular reflectivity and specular transmission approaches as near as possible to the theoretical limit value of 1. Preferably, the transparency is at least 60%, particularly preferably at least 80%.

In one preferred configuration, the scattering locations have an average extent which is at most 1.0 times, preferably at most 0.5 times, particularly preferably at most 0.3 times, the peak wavelength of the coupled-in radiation in the surface light guide, that is to say the vacuum wavelength divided by the refractive index of the material of the surface light guide.

The scattering locations are therefore preferably small relative to the wavelength of the radiation to be scattered. Rayleigh scattering predominantly takes place at such scattering locations. In contrast to scattering locations which are large relative to the wavelength of the radiation, large scattering angles also occur during Rayleigh scattering, which overall results in a high homogeneity of the angular distribution of the emitted radiation.

In the case of large scattering locations, by contrast, the scattering brings about only a relatively small angle change, as a result of which the radiation emerging from the radiation exit area has high luminance particularly at large angles, for instance at angles of 50° or more with respect to the normal to the radiation exit area.

The first layer and the second layer are preferably embodied in such a way that they compensate for a wavelength dependence of the scattering effect. In the case of Rayleigh scattering, for example, the scattering effect is proportional to the fourth power of the frequency of the radiation to be scattered, such that, for example, blue radiation is scattered to a considerably greater extent than red radiation.

In principle, any form of refraction inhomogeneities which results in the scattering of radiation in the desired spectral range is suitable for the scattering locations. By way of example, the scattering locations can be embodied as particles, for instance as air-filled particles, as cavities or as defects in the surface light guide.

The first interface and the second interface delimit in a vertical direction the region of the surface light guide in which total reflection effects at least partial light guidance.

A "layer" of the surface light guide is understood to mean, in particular, a region between the first interface and the second interface whose vertical extent is large enough that it makes a significant contribution to the light guidance for at least one radiation component. By contrast, thin films, for instance films whose vertical extent is less than or equal to the wavelength of the radiation coupled into the surface light guide, do not constitute a layer within the meaning of the present application.

Preferably, the first layer and the second layer are each adapted to a respective radiation component with regard to the scattering effect.

In order to adapt the layers to the respective radiation components, the layers can differ from each other for example in terms of a concentration and/or a size and/or a size distribution and/or a material of the scattering locations. Alternatively or supplementarily, the first layer and the second layer can also differ from one another with regard to the basic material respectively used.

In one first configuration variant, the first layer and the second layer are decoupled from each other with regard to the light guidance.

In accordance with at least one embodiment, the surface light guide is provided for coupling in radiation having a first radiation component and a second radiation component, wherein the radiation components differ from each other with regard to a peak wavelength. The first layer and the second layer are decoupled from each other with regard to the light guidance. The first layer and the second layer are each adapted to a respective radiation component with regard to the scattering effect, such that they compensate for a wavelength dependence of the scattering effect.

In this context, "decoupled from each other with regard to the light guidance" does not mean that the layers are completely optically separated from each other. Rather, the light guiding regions are preferably formed such that the light guidance for the individual radiation components is in each case effected in a dedicated light guiding region. In particular, the radiation coupled out from one layer can pass through at least one of the other layers before exiting through the radiation exit area.

The first layer and the second layer are preferably formed in such a way that a ratio of the first radiation component to the second radiation component is homogeneous over the radiation exit area.

For a radiation exit area emitting white over a large area, the surface light guide can comprise three layers, for example, which are provided for the light guidance of radiation components in the red, green and blue spectral range. Alternatively, or supplementarily, a mixed radiation can be coupled into at least one layer.

An efficient decoupling of the first layer from the second layer can be obtained, for example, by virtue of total internal reflection occurring at least in part between the first layer and the second layer, from the first layer in the direction of the second layer, and vice versa.

In one preferred configuration at least in regions a separating film and/or at least in regions a gap are/is arranged between the first layer and the second layer. The separating film preferably has a refractive index which is less than the refractive index of the first layer and of the second layer. Layers which are decoupled from one another and in which total internal reflection occurs at an area in both directions, that is to say both from the first layer in the direction of the second layer and from the second layer in the direction of the first layer, can thus be realized in a simplified manner.

Alternatively, or supplementarily, the separating film can be formed as a coating formed such that it is reflective at least for one radiation component. An optical separation between the first layer and the second layer is thus simplified more extensively.

In order to form in regions a gap filled with a gas, for instance air, it is possible to provide, for example, spacers between the first layer and the second layer, for instance in the form of elevations.

In one second configuration variant, the first layer and the second layer form partial regions of a light guiding region, in which the first radiation component and the second radiation component propagate.

The light guidance is thus effected for the first radiation component and the second radiation component in a common light guiding region, wherein the first layer and the second layer are formed in such a way that the individual radiation components are influenced to different extents by the individual partial regions. In other words, preferably a greater proportion of at least one radiation component propagates in one of the layers than the other radiation component.

In this case, the first layer and the second layer expediently have mutually different refractive indices. The greater the difference between the refractive indices, the smaller the critical angle of total reflection. The greater this difference, therefore, the greater the proportion of that radiation which is reflected back completely when the radiation impinges at the interface with the optically less dense material.

In one preferred development the surface light guide comprises a further layer which is arranged on that side of the first layer which faces away from the second layer. The first layer, furthermore, preferably has a greater refractive index than the second layer and the further layer.

The first layer can therefore be embedded between two layers having a lower refractive index, such that total internal reflection occurs on both sides of the first layer.

In one preferred development, a material of the first layer has a dispersion in the visible spectral range. Owing to the dispersion, the radiation components each have different critical angles of total internal reflection at the interfaces of the first layer.

In a first variant, the material of the first layer has an anomalous dispersion. Anomalous dispersion has the effect, for example, that the refractive index is higher in the red spectral range than in the blue spectral range. On account of the different angle for total reflection, the first layer acts as a light guide for a greater proportion of the radiation in the red spectral range than for the radiation in the blue spectral range. The first layer preferably has a higher concentration of scattering locations than the second layer and the further layer. The second and/or the further layer can also be formed more extensively in a manner free of scattering locations.

In a second variant, the material of the first layer has a normal dispersion. In this case, predominantly the radiation having the shorter wavelength, for example blue radiation, propagates in the first layer. For efficiently coupling out the radiation having the longer wavelength, the scattering locations are arranged preferably exclusively or at least with a higher concentration in the second layer and/or the third layer.

In both variants, the scattering locations are therefore predominantly formed in that layer in which predominantly the radiation having the greater wavelength propagates. Thus, the radiation components with different spectral components can emerge homogenously from the radiation exit area. The surface light guide can be provided for coupling-out on one side or for coupling-out on two sides.

In one configuration, the surface light guide has a structuring on the side facing away from the radiation exit area.

The structuring can be provided, in particular, for bringing about, relative to coupling-out of radiation on both sides, a displacement of the emission toward the side of the radiation exit area. The structuring can comprise, for example, structure elements in the form of pyramids or hemispheres.

A structure size of the structuring is furthermore preferably smaller than the resolving power of the human eye. What is thus achieved is that the surface light guide, despite the structuring, appears to the eye as a homogeneous, unstructured area.

In a further preferred configuration, at least one layer of the surface light guide has an inhomogeneous distribution of the scattering locations, for instance a distribution having a large number of maxima. By means of these local maxima, for example punctiform regions in which the luminance is increased relative to the remaining regions can be formed on the radiation exit area.

The surface light guide described above is suitable, in particular, for forming a planar emitter, wherein the planar emitter comprises at least one surface light guide and at least one radiation source, wherein the radiation coupled into the surface light guide during the operation of the planar emitter is generated by means of the radiation source.

In one preferred configuration, the radiation source comprises at least one semiconductor body having an active region provided for generating radiation. In a further preferred configuration, the radiation source comprises at least one white light source. Furthermore, the radiation source can comprise a light source in the green spectral range. The light source in the green spectral range can be provided, in particular, for compensating for a green component of the white light source that is excessively low, for example owing to aging.

BRIEF DESCRIPTION OF THE DRAWINGS

Further features, configurations and expediencies will become apparent from the following description of the exemplary embodiments in conjunction with the figures.

Elements that are identical, of identical type or act identically are provided with the same reference symbols in the figures.

The figures and the size relationships of the elements illustrated in the figures among one another should not be regarded as to scale. Rather, individual elements may be illustrated with an exaggerated size in order to enable better illustration and/or in order to afford a better understanding.

DETAILED DESCRIPTION OF ILLUSTRATIVE EMBODIMENTS

Figure 1:
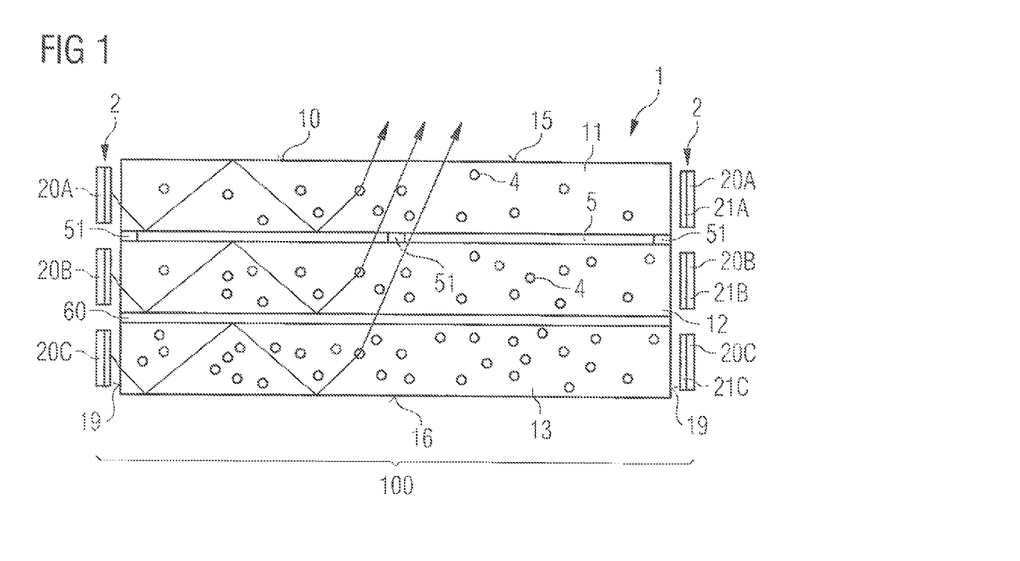
FIG. 1 shows a planar emitter comprising a surface light guide in accordance with a first exemplary embodiment in schematic sectional view.

FIG. 1 shows a planar emitter 100 comprising a surface light guide 1. The surface light guide comprises a first layer 11, a second layer 12 and a further layer 13. The layers 11, 12, 13 are formed between a first interface 15 and a second interface 16. In a vertical direction, that is to say perpendicular to a main extension plane of the surface light guide 1, the interfaces delimit the region of the surface light guide in which the coupled-in radiation propagates, in particular on account of total internal reflection. Scattering locations 4 are formed in the layers 11, 12, 13, and are provided for scattering radiation coupled into the surface light guide laterally, that is to say along a main extension direction of the surface light guide. The proportion of radiation which emerges from a radiation exit area 10 is increased by means of the scattering locations 4.

The layers 11, 12, 13 are decoupled from one another with regard to the light guidance at least in regions. The decoupling is effected in each case by means of total internal reflection at the transitions between the first layer 11 and the second layer 12, and respectively between the second layer and the further layer 13.

Spacers 51 are arranged between the first layer 11 and the second layer 12, such that in regions a gap 5 is formed, which optically decouples the layers from one another.

As a further example of optical decoupling, a separating film 60, for example in the form of a coating, is formed between the second layer 12 and the further layer 13. The separating film has a lower refractive index than the second layer 12 and the further layer 13.

The separating film 60 can furthermore also be formed such that it is reflective for at least one radiation component, in order to increase the coupling-out of the radiation on the part of the radiation exit area 10.

The separating film preferably contains a dielectric material, which is furthermore preferably transparent to radiation in the visible spectral range. By way of example, an oxide, for instance silicon oxide, or a nitride, for example silicon nitride, is suitable. The separating film can also be embodied in multilayered fashion.

The layers 11, 12, 13 form a separate light guiding region in each case for the radiation coupled in through a side area 19, wherein the light guiding regions are in each case provided for different radiation components. By way of example, the first layer 11 can be provided for blue radiation, the second layer 12 for green radiation, and the further layer 13 for red radiation.

The layers 11, 12, 13 are formed with regard to the scattering effect in such a way that the individual radiation components emerge homogeneously from the radiation exit area 10. In the exemplary embodiment shown, the layers are adapted to the respective radiation component by means of a variation in the concentration of the scattering locations 4. Alternatively or supplementarily, the layers 11, 12, 13 can also be adapted by means of an adaptation of the material of the scattering locations 4 and/or of the layers 11, 12, 13, by means of the size of the scattering locations and/or the size distribution of the scattering locations.

The extent of the scattering locations 4 is preferably small relative to the wavelength of the coupled-in radiation in the surface light guide 1.

Preferably, an average extent of the scattering locations is at most 1.0 times, particularly preferably at most 0.5 times, most preferably at most 0.3 times the peak wavelength of the coupled-in radiation. Predominantly Rayleigh scattering occurs for such wavelengths, which results in a homogeneous angular distribution of the luminance of the radiation emerging from the radiation exit area 10.

For two arbitrary points on the radiation exit area, the associated color loci in the chromaticity diagram (CIE diagram) for a predefined emission angle preferably lie within a 5-step McAdam ellipse, particularly preferably within a 3-step McAdam ellipse. The emission can therefore be distinguished by a high homogeneity with regard to the color locus.

For two arbitrary points on the radiation exit area, the luminance for a predefined emission angle preferably differs at most by a factor of two.

In this exemplary embodiment, a higher concentration of scattering locations 4 in the third layer 13 provided for the propagation of red radiation compensates for the lower scattering effect of the scattering locations relative to the blue and green radiation, having shorter wavelengths in comparison. Despite the reduced scattering effect for the radiation having a longer wavelength in the case of Rayleigh scattering, the coupling-out effect from the radiation exit area 10 is approximately identical for the individual radiation components from the respectively assigned layer 11, 12, 13.

Suitable material for the surface light guide is, for example, a glass or a plastic, for example polymethyl methacrylate (PMMA), polycarbonate (PC) or polyurethane (PU), wherein glass and PMMA are distinguished by a particularly high transparency.

Preferably, the transparency of the surface light guide 1 in accordance with the definition mentioned further above is at least 60%, particularly preferably at least 80%.

By way of example, particles embedded into the layers 11, 12, 13 are suitable as scattering locations 4. The particles can be solid or else embodied as hollow bodies, for example as air-filled particles.

Cavities or defects in the surface light guide can also serve as scattering locations. Such cavities or defects can be produced, for example, by targeted local evaporation of material of the surface light guide 1. This can be achieved for example thermally and/or optically, for instance by means of laser radiation.

With the planar emitter 100 described, mixed radiation that appears white homogeneously and over a large area to the human eye can be generated by means of the three radiation components in the red, green and blue spectral range. However, in a departure from the exemplary embodiment described, this can also be achieved with a number of layers that deviates from three. By way of example, in the case of only two layers, the first layer 11 can be provided for coupling in red radiation and the second layer 12 for mixed radiation that appears mint-white.

By comparison with a surface light guide wherein all radiation components propagate in a common light guiding region, the radiation emitted by the surface light guide 1 described is distinguished, in particular, by a particularly high homogeneity in the color space with at the same time high transparency in the switched-off state. The ratio of the radiation components to one another is therefore particularly homogeneous across the radiation exit area 10.

The planar emitter 100 furthermore has a radiation source 2 in each case on both sides of the surface light guide 1. The radiation source 2 comprises a first semiconductor body 20a for generating blue radiation, a second semiconductor body 20b for generating green radiation, and a third semiconductor body 20c for generating red radiation, wherein an active region 21a, 21b, 21c provided for generating radiation is respectively provided in the semiconductor bodies.

The radiation source 2 comprises only one semiconductor body for each spectral component merely for the sake of simplifying the illustration. In a departure from that, it is also possible to provide a multiplicity of semiconductor bodies, which can be arranged, for example, in a line-like or matrix-like manner.

In a departure from that, the radiation source can also be embodied as a gas discharge lamp, for example.

Figure 2:
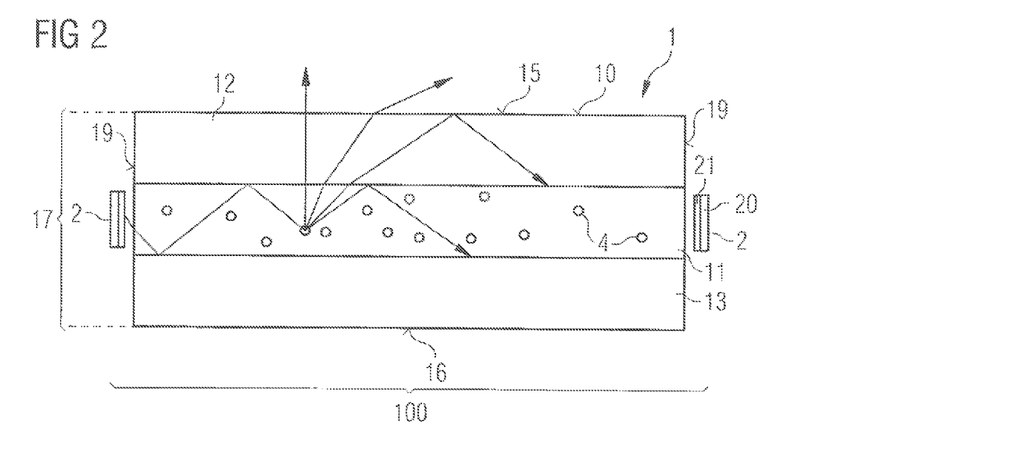
FIG. 2 shows a planar emitter comprising a surface light guide in accordance with a second exemplary embodiment in schematic sectional view.

A second exemplary embodiment of a planar emitter 100 comprising a surface light guide 1 is illustrated in FIG. 2. The planar emitter 100 once again comprises a surface light guide 1 and radiation sources 2, radiation being coupled in through a side area 19 that delimits the surface light guide 1 in the main extension plane. The surface light guide 1 has a first layer 11 between a first interface 15 and a second interface 16, said first layer being arranged between a second layer 12 and a further layer 13. In contrast to the first exemplary embodiment, the layers 11, 12, 13 form partial regions of a common light guiding region 17, in which the different radiation components of the radiation generated by the radiation source 2 propagate. The first layer 11 has a higher refractive index than the second layer 12 and the further layer 13, such that total internal reflection can occur in each case at the transitions between these layers.

In this case, the following relationship holds true for the critical angle $\theta_{TIR}$ of total internal reflection.

$$\theta_{TIR} = \arcsin(n_2/n_1)$$

wherein $n_1$ represents the refractive index of the first layer and $n_2$ represents the refractive index of the second layer. A corresponding relationship likewise holds true for the further layer 13 having a refractive index $n_3$.

It is evident from this that the proportion of radiation for which total internal reflection occurs is all the higher, the higher the refractive index $n_1$ relative to the refractive index $n_2$. By means of the choice of refractive indices, therefore, it is possible to set the magnitude of the proportion of the radiation propagating in the first layer on account of total internal reflection.

By way of example, PMMA having a refractive index of approximately 1.5 and a glass having a refractive index of between 1.4 and 1.48 inclusive can be used for the first layer.

In the case of glass, the refractive index can be set between 1.4 and 1.9 through a suitable choice of the composition. Furthermore, compared with plastic, glass is distinguished by a higher optical stability and is easier to clean, and so glass is particularly suitable for the outer layers of the surface light guide.

In the exemplary embodiment illustrated in FIG. 2, the material of the first layer 11 has an anomalous dispersion in the visible spectral range, such that the refractive index for example for long-wave red radiation is greater than that for blue radiation having a shorter wavelength. By way of example the first layer can comprise a fluorophosphate glass having anomalous dispersion.

In accordance with the above relationship, this has the effect that the critical angle of the total internal reflection is smaller for red radiation than for blue radiation. Consequently, the blue radiation is distributed to a greater extent in the light guiding region 17 formed by the layers 11, 12, 13, while a greater proportion of the red radiation remains in the first layer 11. In order to compensate for the wavelength-dependent scattering effect for Rayleigh scattering as described in connection with FIG. 1, the scattering locations 4 are formed in the first layer 11.

By contrast, the second layer 12 and the further layer 13 can be free of scattering locations or at least have a lower concentration of scattering locations than the first layer 11. By means of the second layer 12 and the further layer 13, therefore, the average light path between impingement on the scattering locations 4 is lengthened for blue radiation in comparison with the red radiation. This leads to a compensation of the more efficient scattering for blue radiation, such that the radiation emerging from the radiation exit area 10 has a high homogeneity of the color locus.

Figure 3:
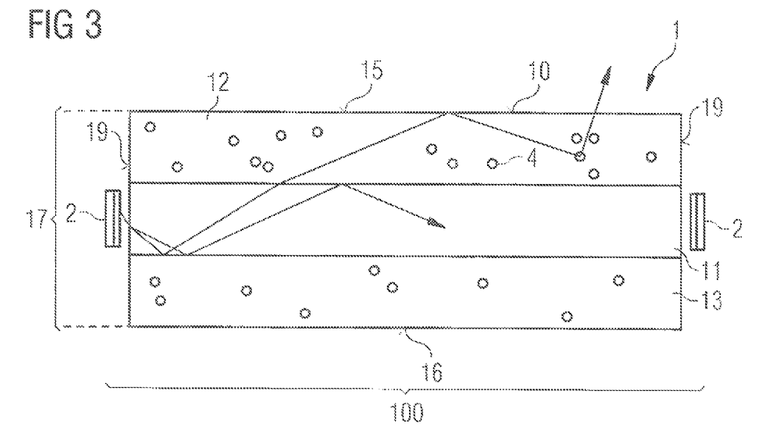
FIG. 3 shows a planar emitter comprising a surface light guide in accordance with a third exemplary embodiment in schematic sectional view.

The third exemplary embodiment illustrated in FIG. 3 substantially corresponds to the second exemplary embodiment described in connection with FIG. 2. In contrast thereto, the material for the first layer 11 has a normal dispersion. Consequently, a greater proportion of the blue radiation than the red radiation remains within the first layer 11. In this case, in order to compensate for the wavelength-dependent scattering effect for Rayleigh scattering, the scattering locations 4 can be formed in the second layer 12 and/or the further layer 13. By contrast, the first layer 11 can be free of scattering locations or at least have a lower concentration of scattering locations.

Figure 4:
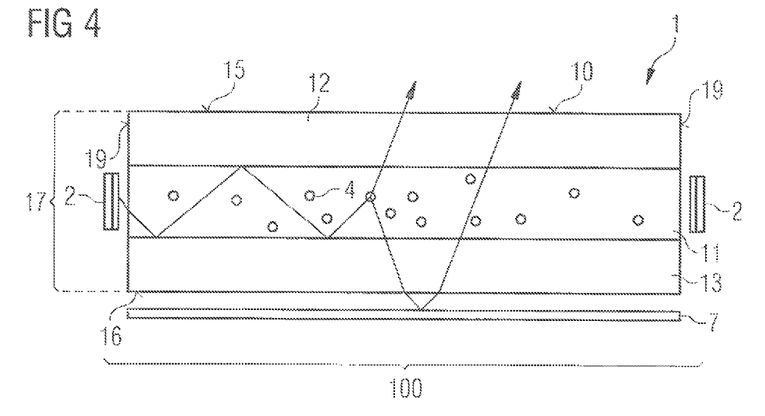
FIG. 4 shows a planar emitter comprising a surface light guide in accordance with a fourth exemplary embodiment in schematic sectional view.

The fourth exemplary embodiment of a planar emitter 100 comprising a surface light guide 1 as illustrated in FIG. 4 substantially corresponds to the second exemplary embodiment described in connection with FIG. 2. In contrast thereto, a reflector layer 7 is formed on the side facing away from the radiation exit area 10. The reflector layer is preferably configured such that it exhibits broadband reflection. The reflector layer can, for example, contain a metal or a metallic alloy or consist of a metal or a metallic alloy. By way of example, aluminum, silver and rhodium are distinguished by a high reflectivity in the visible spectral range.

By means of the reflector layer 7, the radiation components emerging from that side of the surface light guide 1 which faces away from the radiation exit area 10 can be deflected in the direction of the radiation exit area and emerge through the latter. The radiation power emerging overall on the part of the radiation exit area can thus be increased.

It goes without saying that the reflector layer described can also be used for the exemplary embodiments described in connection with FIGS. 1 and 3.

Figure 5:
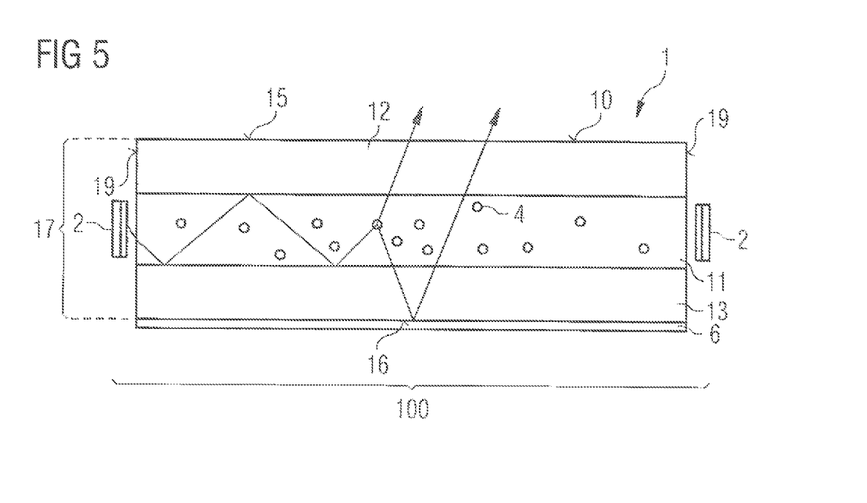
FIG. 5 shows a planar emitter comprising a surface light guide in accordance with a fifth exemplary embodiment in schematic sectional view.

The fifth exemplary embodiment illustrated in FIG. 5 substantially corresponds to the fourth exemplary embodiment. In a departure therefrom, a coating 6 is applied instead of the reflector layer on the second interface 16. The coating preferably contains a dielectric material, for example one of the materials mentioned in connection with the separating film. Such a, preferably multilayered coating can have a high reflectivity at least for one radiation component.

Figure 6:
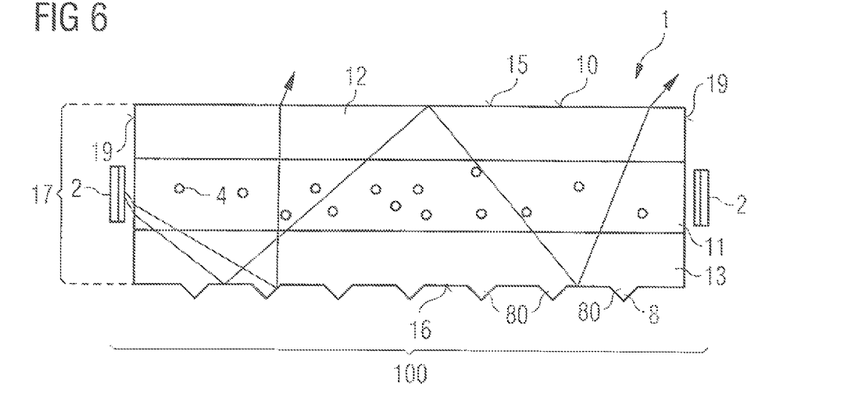
FIG. 6 shows a planar emitter comprising a surface light guide in accordance with a sixth exemplary embodiment in schematic sectional view.

The sixth exemplary embodiment of a planar emitter 100 comprising a surface light guide 1 as illustrated in FIG. 6 substantially corresponds to the second exemplary embodiment described in connection with FIG. 2. In contrast thereto, a structuring 8 is formed on that side of the surface light guide 1 which faces away from the radiation exit area 10. In this exemplary embodiment, the structuring is formed by means of elevations 80 embodied in pyramidal fashion. Other shapes can also be used for the elevations, for example having a polygonal or at least partly curved cross section, for instance hemispherical.

As an alternative or in addition to elevations, depressions can also be used. For clarification, the figure illustrates two possible beam paths wherein the radiation is coupled out even without impinging on scattering locations. In this case, the structuring 8 fosters a deflection of the propagating radiation into small angles with respect to the normal to the radiation exit area. Alternatively or supplementarily, the first layer 11 can also already be structured, in particular on the side facing away from the radiation exit area 10.

A structure size of the structuring 8 preferably lies below the resolving power of the human eye. By way of example, structures having a size of less than 30 μm can no longer be resolved by the human eye from a distance of 10 cm. Such a structuring is therefore perceived as a homogeneous area by the human eye.

Figure 7:
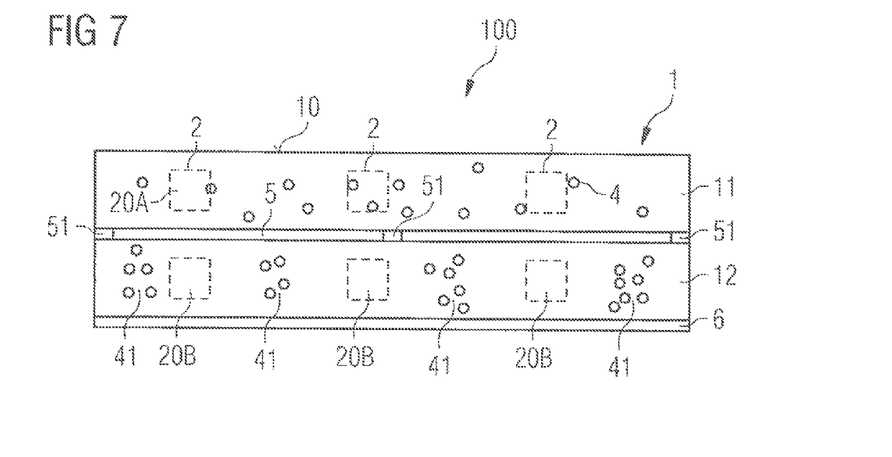
FIG. 7 shows a planar emitter comprising a surface light guide in accordance with a seventh exemplary embodiment in schematic sectional view.

A seventh exemplary embodiment, which substantially corresponds to the first exemplary embodiment described in connection with FIG. 1, is illustrated schematically in FIG. 7. The illustration is rotated by 90° in this figure, such that the emission from the radiation sources 2 takes place perpendicularly to the plane of the drawing.

In contrast to the first exemplary embodiment, the surface light guide 1 comprises a first layer 11 and a second layer 12, wherein the first layer and the second layer differ, in particular, with regard to the distribution of the scattering locations 4. In the first layer 11, the scattering locations have a distribution in a lateral direction that is uniform within the scope of statistical fluctuations. In contrast thereto, the scattering locations in the second layer 12 are deliberately distributed non-uniformly in a lateral direction. The distribution of the scattering locations 4 forms local maxima 41, at which locally boosted scattering occurs. The local maxima are formed in striped-fashion. In the regions of the local maxima this leads to an increased coupling-out of radiation from the radiation exit area 10.

Such local maxima can be produced, for example, by using particles having a dipole moment, wherein an electric field is applied during production.

Consequently, firstly a homogeneous radiation component resulting from the first layer 11 and an inhomogeneous radiation component resulting from the second layer 12 emerge from the radiation exit area 10. A planar emitter 100 comprising such a surface light guide 1 is suitable, in particular, for effect lighting.

The inhomogeneity of the radiation component of the second layer 12 can be set by means of the position of the stripes relative to the radiation source. In the exemplary embodiment shown, the local maxima 41 are in each case arranged offset with respect to a main emission direction of the semiconductor bodies 20B of the radiation source 2. The homogeneity of the emission is increased as a result. However, it is also possible to refrain from such an offset in order to increase the inhomogeneity of the emission more extensively. In this case, the semiconductor bodies 20a and 20b assigned to the respective layers 11, 12 can, with regard to the emission spectrum, be embodied such that they are of identical type, for example as white light sources, or differently than one another.

In contrast to the first exemplary embodiment described in connection with FIG. 1, the surface light guide has a coating 6 on the radiation exit area 10, which coating, as described in connection with FIG. 5, leads to an increase in the proportion of radiation emerging from the radiation exit area 10. However, such a coating can also be dispensed with, such that the surface light guide can be configured as emissive on both sides.

Figure 8:
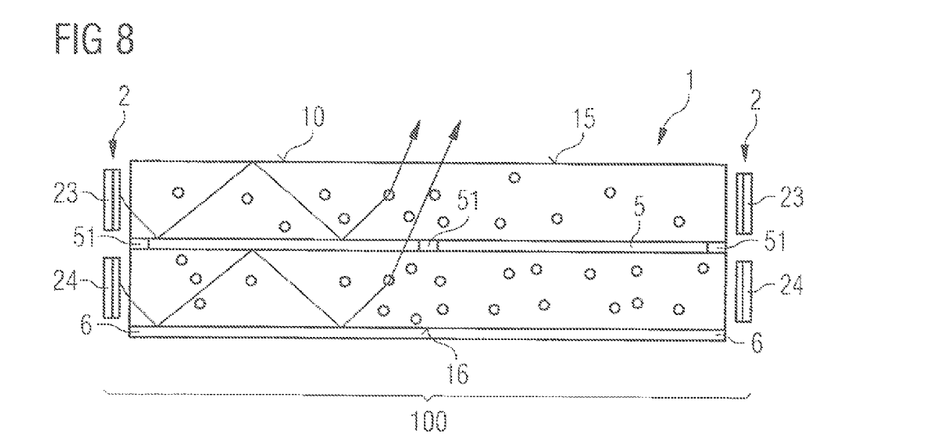
FIG. 8 shows a planar emitter comprising a surface light guide in accordance with an eighth exemplary embodiment in schematic sectional view.

The eighth exemplary embodiment illustrated in FIG. 8 substantially corresponds to the seventh exemplary embodiment described in connection with FIG. 7. In contrast thereto, the scattering locations 4 are arranged in a manner distributed uniformly in the first layer 11 and in the second layer 12. The radiation source 2 comprises a white light source 23 and a light source 24 in the green spectral range.

The light source 24 is provided for influencing the green component of the radiation emerging overall from the radiation exit area 10. In particular, an aging-dictated degradation of the white light source 23, which leads to a decrease in the green component in the spectrum, can be compensated for by means of the light source 24.

Such a planar emitter 100 can therefore be distinguished by a higher constancy of the color locus over its lifetime.

The invention is not restricted by the description on the basis of the exemplary embodiments. Rather, the invention encompasses any novel feature and also any combination of features, which in particular includes any combination of features in the patent claims, even if this feature or this combination itself is not explicitly specified in the patent claims or the exemplary embodiments.

The invention claimed is:

1. A surface light guide, comprising:
    a radiation exit area running along a main extension plane of the surface light guide and being provided for laterally coupling in radiation;
    scattering locations for scattering the coupled-in radiation;
    a first interface and a second interface, which delimit light guidance of the coupled-in radiation in a vertical direction;
    a first layer and a second layer formed one on top of the other in the vertical direction between the first interface and the second interface; and
    a separating film arranged between the first layer and the second layer;
    wherein the surface light guide is provided for coupling in radiation having a first radiation component and a second radiation component; and
    wherein the first layer and the second layer are decoupled from one another with regard to the light guidance.

2. The surface light guide according to claim 1, wherein the scattering locations have an average extent which is at most 1.0 times a peak wavelength of the coupled-in radiation in the surface light guide.

3. The surface light guide according to claim 1, wherein the first layer and the second layer are formed in such a way that a ratio of the first radiation component to the second radiation component is homogeneous over the radiation exit area.

4. The surface light guide according to claim 1, wherein the first layer and the second layer are each adapted to a respective radiation component with regard to scattering effect.

5. The surface light guide according to claim 1, further comprising a gap arranged between the first layer and the second layer.

6. The surface light guide according to claim 1, wherein the first layer and the second layer form partial regions of a light guiding region in which the first radiation component and the second radiation component propagate.

7. The surface light guide according to claim 6, further comprising a further layer arranged on that side of the first layer that faces away from the second layer, wherein the first layer has a higher refractive index than the second layer and the further layer.

8. The surface light guide according to claim 7, wherein a material of the first layer has an anomalous dispersion in the visible spectral range and the first layer has a higher concentration of scattering locations than the second layer and the further layer.

9. The surface light guide according to claim 7, wherein a material of the first layer has a normal dispersion in the visible spectral range and the first layer has a lower concentration of scattering locations than the second layer and the further layer.

10. The surface light guide according to claim 1, wherein the surface light guide has a structuring on a side facing away from the radiation exit area.

11. A planar emitter comprising:
    the surface light guide according to claim 1; and
    at least one radiation source, wherein the radiation coupled into the surface light guide during operation of the planar emitter is generated by the radiation source.

12. The planar emitter according to claim 11, wherein the radiation source comprises a semiconductor body having an active region provided for generating radiation.

13. The planar emitter according to claim 11, wherein the radiation source comprises a white light source and a light source in the green spectral range.

14. A planar emitter comprising:
    a first surface light guide;
    a second surface light guide; and
    at least one radiation source, wherein radiation coupled into the first surface light guide during operation of the planar emitter is generated by the radiation source and wherein the radiation coupled into the second surface light guide during operation of the planar emitter is generated by the radiation source;
    wherein the first surface light guide comprises:
        a radiation exit area running along a main extension plane of the surface light guide and being provided for laterally coupling in the radiation;
        scattering locations for scattering the coupled-in radiation;
        a first interface and a second interface, which delimit light guidance of the coupled-in radiation in a vertical direction; and
        a first layer and a second layer formed one on top of the other in the vertical direction between the first interface and the second interface.

15. The planar emitter according to claim 14, wherein the second surface light guide comprises:
    a second radiation exit area running along a main extension plane of the surface light guide and being provided for laterally coupling in radiation;
    second scattering locations for scattering the coupled-in radiation;
    a third interface and a fourth interface, which delimit light guidance of the coupled-in radiation in a vertical direction; and
    a third layer and a fourth layer formed one on top of the other in the vertical direction between the third interface and the fourth interface.

16. A surface light guide, comprising:
    a radiation exit area running along a main extension plane of the surface light guide and being provided for laterally coupling in radiation;
    scattering locations for scattering the coupled-in radiation;
    a first interface and a second interface, which delimit light guidance of the coupled-in radiation in a vertical direction;

a first layer and a second layer formed one on top of the other in the vertical direction between the first interface and the second interface; and a further layer arranged on that side of the first layer that faces away from the second layer, wherein the first layer has a higher refractive index than the second layer and the further layer, wherein the surface light guide is provided for coupling in radiation having a first radiation component and a second radiation component.

17. The surface light guide according to claim 16, wherein a material of the first layer has an anomalous dispersion in the visible spectral range and the first layer has a higher concentration of scattering locations than the second layer and the further layer.

18. The surface light guide according to claim 16, wherein a material of the first layer has a normal dispersion in the visible spectral range and the first layer has a lower concentration of scattering locations than the second layer and the further layer.

19. The surface light guide according to claim 16, further comprising a separating film arranged between the first layer and the second layer.

20. The surface light guide according to claim 16, further comprising a separating film and a gap arranged between the first layer and the second layer.

* * * * *

UNITED STATES PATENT AND TRADEMARK OFFICE
CERTIFICATE OF CORRECTION

PATENT NO. : 8,998,479 B2  
APPLICATION NO. : 13/643055  
DATED : April 7, 2015  
INVENTOR(S) : Peter Brick et al.

Page 1 of 1

It is certified that error appears in the above-identified patent and that said Letters Patent is hereby corrected as shown below:

On the Title Page, Item (73) Assignee, Line 1, delete "OSRAM Opto Semiconductor GmbH," and insert --OSRAM Opto Semiconductors GmbH,--.

Signed and Sealed this  
Thirteenth Day of October, 2015

Michelle K. Lee  
*Director of the United States Patent and Trademark Office*